Nov. 29, 1955     W. D. CRATER ET AL     2,724,965
MEANS FOR DETECTING AND MEASURING TORQUE
Filed Dec. 24, 1952     3 Sheets-Sheet 1
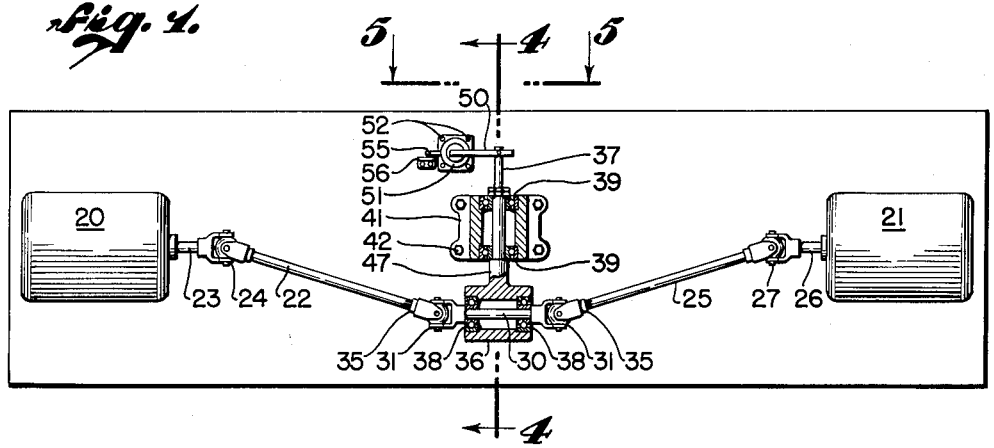
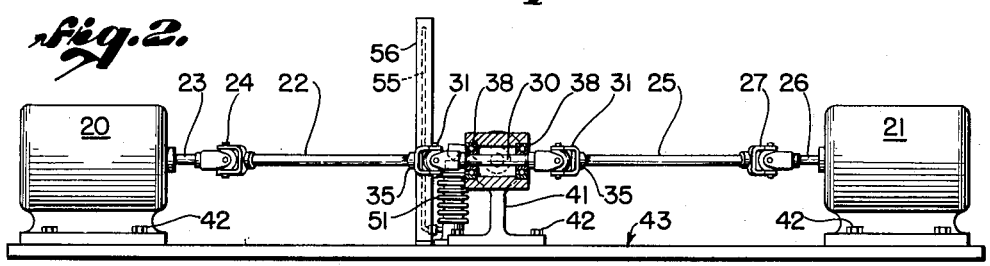
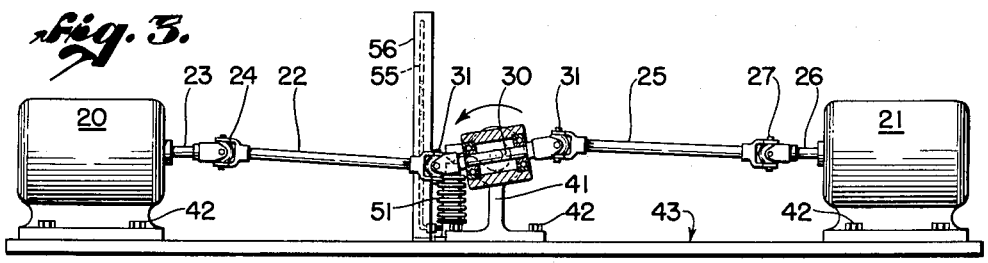
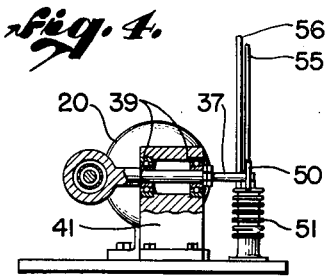
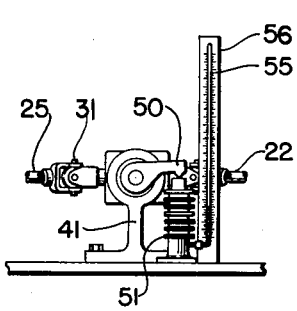
WILBUR D. CRATER &
HENRY SHAPIRO,
INVENTORS.
BY *George V. Smyth*
ATTORNEY.

Nov. 29, 1955  W. D. CRATER ET AL  2,724,965
MEANS FOR DETECTING AND MEASURING TORQUE
Filed Dec. 24, 1952  3 Sheets-Sheet 2

WILBUR D. CRATER &
HENRY SHAPIRO,
INVENTORS.

BY George V. Smyth
ATTORNEY.

Nov. 29, 1955 W. D. CRATER ET AL 2,724,965
MEANS FOR DETECTING AND MEASURING TORQUE
Filed Dec. 24, 1952 3 Sheets-Sheet 3

WILBUR D. CRATER &
HENRY SHAPIRO,
INVENTORS.

BY George W. Smyth

ATTORNEY.

United States Patent Office 2,724,965
Patented Nov. 29, 1955

2,724,965

MEANS FOR DETECTING AND MEASURING TORQUE

Wilbur D. Crater and Henry Shapiro, Los Angeles, Calif., assignors to Propulsion Research Corporation, Inglewood, Calif.

Application December 24, 1952, Serial No. 327,896

15 Claims. (Cl. 73—136)

This invention relates to devices pertaining to the detection and/or measurement of torque in mechanical power transmission systems, as well as to devices for indicating, measuring and absorbing or damping torque transients. The invention provides a reliable and accurate means for obtaining a static torque reaction in a dynamic transmission system in a completely mechanical manner with relatively simple structure. The invention obviates the necessity for slip rings and avoids all the complications of electrical and hydraulic dynamometric systems.

The invention takes advantage of the fact that wherever even a minor change of direction occurs in shafting that connects a source of mechanical power with a load or power-absorbing device, a torque reaction proportionate to the driving torque occurs at the shaft bearings involved in the change of shaft direction. In accord with the teachings of the invention, two adjacent sections of the interconnecting shafting are positioned relative to each other at an appropriate angle less than 180° with each shaft short of the vertex of the angle. The two angled shafts or shaft sections are interconnected by suitable rotary means for power transmission and the interconnecting means is journaled on one axis in a suitable bearing means that is free to rotate about a second reaction axis, the reaction axis being at an angle to each of the two interconnected shafts. The reaction torque of the bearing means about the selected axis may be readily evaluated by suitable force measuring means thereby to determine the magnitude of the driving torque transmitted from the power source to the load.

As the torque is measured by the reaction forces produced by the change of direction of the coupled shafts and as no means such as slip links or the like are used for transmitting measurements from the rotating shafts, the present invention is particularly useful in high speed torque problems.

A characteristic of the invention is that it is flexible in a number of different respects. In the first place, it is flexible with respect to the range of angles between the two shafts or shaft sections. The range includes any angle greater than zero and less than 180°. In the second place, the invention affords a wide range of flexibility with respect to the ratio of the reaction torque to the driving torque transmitted from the power source to the load. This ratio may be varied as desired by varying the angle of the two shafts and by varying the relative direction of the reaction torque axis.

If the angle between the two shafts is nearly 180°, the ratio of the reaction torque to the driving torque will be relatively small. As this angle is decreased progressively, the ratio will progressively increase. As for the significance of the relative direction of the reaction torque axis, a feature of the invention is that the reaction torque axis is subject to adjustment in two degrees or dimensions. For a given drive torque delivered by the power source, and a given angle between the two shafts, the maximum reaction torque is obtained by placing the reaction axis in the plane of the two shafts and in a direction bisecting the angle between the two shafts. Starting with this optimum relative direction of the reaction torque axis, the reaction torque may be progressively reduced at one varying rate by progressively varying the direction of the reaction axis in the plane of the two shafts and may be progressively reduced at a different varying rate by progressively varying the angle of the reaction axis relative to the plane of the two shafts. The plane of the two shafts is, of course, the general plane in which the two shafts lie when the system is idle and free from any driving torque.

At one extreme, a high ratio of reaction torque to driving torque is achieved by placing the two shafts at a relatively small angle relative to each other and by placing the reaction torque axis in the same plane as the two shafts with the reaction axis bisecting the angle. At the other extreme, a relatively low ratio may be obtained by placing the two shafts at near 180° relative to each other with the reaction axis adjusted at an unfavorable position with respect to one or both of its dimensions of adjustment. In between these two extremes an infinite number of relationships is possible.

It is a feature of the invention that one of the two factors may be varied to compensate, at least in part, for the other factor. Thus, if it is desirable, for some controlling reason, to place the two shafts at a relatively small angle relative to each other thereby favoring a high ratio of reaction torque to driving torque, the reaction torque may be kept to a desired low magnitude by positioning the reaction axis in an appropriate unfavorable direction. On the other hand, if it is desirable for controlling reasons to place the two shafts at nearly 180° relative to each other thereby tending to minimize the reaction torque, the magnitude of the reaction torque may be favored by placing the reaction axis in the same plane as the two shafts and in a position to bisect the angle between the shafts.

In the third place, the invention is flexible with respect to its primary function or object. On the one hand, the torque-responsive bearing structure that rotates about the reaction axis may be of relatively large rotary inertia and be coupled to a suitable force-opposing device to make it nonresponsive to torsional vibration and other transient torque changes. On the other hand, the torque-responsive bearing structure may be relatively light and coupled with a suitably sensitive force-resisting device to respond to vibratory or transient torques. In one practice of the invention, a force-measuring device may be employed of a type that yields only to a minute extent in carrying out its measuring function and, therefore, practically immobilizes the torque-responsive bearing structure to avoid absorption of any appreciable amount of the drive torque. In a still further practice of the invention the mass of the torque-responsive structure and the operating characteristics of the force-resisting device that opposes rotation of the structure about the reaction axis may be selected primarily for the purpose of sufficient power absorption to damp or eliminate all minor torque fluctuations.

An important advantage of the invention is that it makes possible a new procedure for detecting and measuring the drive torque in an existing installation wherein a power source is connected to a load or power-consuming device by the usual straight shafting. The procedure consists in misaligning two adjacent sections of the shafting slightly, say as little as one or two degrees, to form the required angle of nearly 180° between the shafts and then interconnecting the slightly angled shafts by means journaled in a bearing structure that is rotatable about an appropriate reaction axis. It is a simple matter to introduce the desired slight change in direction in the interconnecting shafting by slightly shifting the position of either the power source or the power consuming device, or by offsetting the shafting without such shifting in position as will be explained. In either event the procedure is simple in its application, especially in comparison to dynamometric systems that require either the power source or the power-consuming device to be especially mounted on cradles or the like for bodily movement.

A further feature of the invention is that the ratio between the reaction torque and the driving torque may be ascertained simply by applying a known static torque to one of the two shafts while the other shaft is held against rotation and then measuring the resultant static torque about the reaction axis. In all practices of the invention, this simple procedure of calibration may be utilized or, of desired, the ratio may be computed by means of vector diagrams in a manner well known in the art.

The various features, advantages, and potential uses of the invention may be readily understood from the following detailed description of selected practices of the invention considered with the accompanying drawings.

In the drawings, which are to be regarded as merely illustrative:

Figure 1 is a plan view, partly in section, illustrating one practice of the invention;

Figure 2 is a side elevation, partly in section, of the same structure showing the positions of the co-operating parts in the absence of any driving torque whatsoever;

Figure 3 is a view similar to Figure 2 showing the positions of the cooperating parts under applied driving torque;

Figure 4 is a transverse section taken as indicated by the line 4—4 of Figure 1;

Figure 5 is a fragmentary side elevation taken as indicated by the two arrows 5 in Figure 1;

Figure 7:
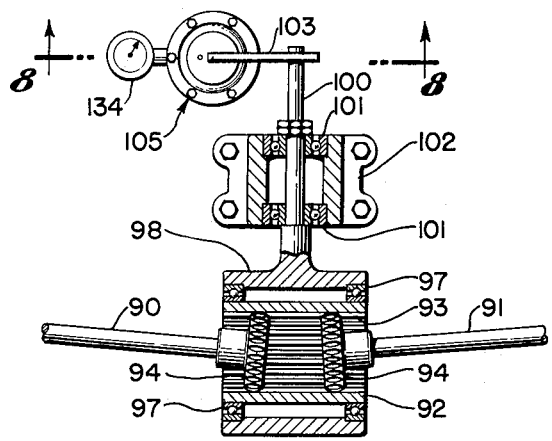
Figure 7 is a fragmentary view, partly in section and partly in plan, illustrating a third embodiment of the invention showing the two shafts positioned at relatively small angles.

In Figures 1 to 5, a source of mechanical power in the form of a motor 20 is operatively connected by shafting with a power-consuming means or load device in the form of a generator 21. The parts that co-operate for measurement of the driving torque transmitted to the generator include a drive shaft 22 that is connected to the motor shaft 23 by a universal joint 24 and include a driven shaft 25 that is connected to the generator shaft 26 by a universal joint 27.

In accord with the teachings of the invention, the drive shaft 22 and the driven shaft 25 are positioned relative to each other at an angle greater than 0° with at least one shaft short of the vertex of the angle, the angle in this instance being closer to 180° than to 90°. In Figures 1–5, both of the two shafts 22 and 25 fall short of the vertex of the angle, in this instance by equal distances, and are interconnected by a suitable rotary means for the transmission of driving torque. In this particular example the interconnecting rotary means is in the form of a short intermediate shaft 30 that is operatively connected to the two shafts 22 and 25, respectively, by universal joints 31.

It is usually desirable to include some kind of longi-tudinally extensible connecting means in the arrangement of shafts and for this purpose each of the two shafts 22 and 25 may be of splined telescopic construction. In the construction shown each of the universal joints 31 is unitary with a tubular member 35 which is slidingly mounted on the corresponding shaft 22 or 25 and is keyed thereto to serve as a slidable extension thereof.

The intermediate shaft 30 may be rotatably mounted in any suitable bearing means or structure that in turn is mounted for rotation about an appropriate reaction torque axis. In this instance the direction of the reaction torque axis is chosen for maximum ratio between the reaction torque and the driving torque that is transmitted from the drive shaft 22 to the driven shaft 25. This optimum position for the reaction torque axis is in substantially the same plane as the two shafts 22 and 25 when the shaft system is free from torque and is positioned in that plane to bisect the angle formed by the two shafts.

In the construction shown in Figures 1 to 5, the rotatably mounted bearing means comprises a cylindrical bearing housing 36 and a reaction shaft 37 on which the bearing housing is mounted for rotation about the selected reaction torque axis. The bearing housing 36 encloses a pair of suitable anti-friction bearings 38 for the intermediate shaft 30. The reaction shaft 37 carrying the bearing housing is also mounted in a pair of anti-friction bearings 39 in a suitable bracket or pedestal 41.

The motor 20 and the generator 21 and the pedestal 41 are all mounted either on a common base or on separate supports that are rigidly fixed relative to each other. In the particular arrangement shown in the drawings, the motor, generator and pedestal are mounted by suitable bolts 42 on a common base 43 that is of relatively heavy non-yielding construction.

The reaction shaft 37 may be provided with suitable means to prevent longitudinal movement relative to the two bearings 39. In the construction shown, the bearing housing 36 is mounted on the reaction shaft 37 by a tubular extension 47 that forms a shoulder in abutment against one of the two bearings 39 and a pair of jam nuts is mounted on the reaction shaft in abutment against the other bearing 39. The reaction shaft 37 is also provided with suitable means for transmitting the reaction force to a suitable force-measuring means. For this purpose, a suitable arm 50 may be fixedly mounted on the reaction shaft 37, which arm may be conveniently termed a reaction torque arm. Although any conventional force or torque measuring means can be used, in the illustrated embodiment now being described, the reaction torque arm 50 rests against the upper end of a liquid container in the form of resilient bellows 51 which is mounted on the base 43 by suitable screws 52. The bellows 51 contains a suitable liquid such as alcohol, water or mercury and is connected to an upright manometer tube 55 which extends adjacent a suitable scale 56. Pressure by the reaction torque arm 50 against the bellows 51 displaces liquid therefrom into the manometer tube 55 to raise the liquid level in the tube and thereby raise the hydrostatic pressure in the bellows to a magnitude corresponding to the reaction torque force. Such a force measuring means has advantages over measuring devices that depend upon the stressing of a spring, although a spring force measuring device would prove satisfactory in many instances.

The manner in which the described structure operates may be readily understood by comparing Figures 2 and 3. With the motor 20 idle and the system of shafting stationary, the arrangement is preferably but not necessarily such that the drive shaft 22, the driven shaft 25 and the interconnecting shaft 30, all lie substantially in a common plane, as shown in Figure 2. When the motor 20 is energized to transmit a torque through the described shafting to the generator 21, the reaction torque about the reaction shaft 37 will cause the bearing means 36 to rotate about the reaction axis against the resistance of the liquid in the bellows container 51, the amount of rotation being in accord with the magnitude of the driving torque transmitted from the drive shaft 22 to the driven shaft 25. As a result, the liquid column in the manometer tube 55 will rise to a level corresponding to the magnitude of the driving torque and the corresponding value may be read from the scale 56. It should be obvious now that a preselected weight may be affixed to the extreme tip of the reaction torque arm 50 which would preload the force measuring device and afford one method of measuring both positive and negative torques. It will also be seen that by merely supplying a duplicate of the bellows 51 and its associated manometer tube 55, the manometer devices would then also measure positive as well as negative torques. Whatever means are used, the scale 56 may be calibrated simply by preventing the driven shaft 25 from rotating and then applying a known static torque or series of known static torques or series of known static torques to the drive shaft 22.

It will be apparent to those skilled in the art that the drive shaft and the driven shaft in such an arrangement may be operatively interconnected by various means other than universal joints and other than an intermediate shaft. If the angle formed by the drive shaft and driven shaft is an acute angle rather than an obtuse angle, the two shafts may be interconnected by bevel gears as shown, for example, in Figure 6.

Figure 6:
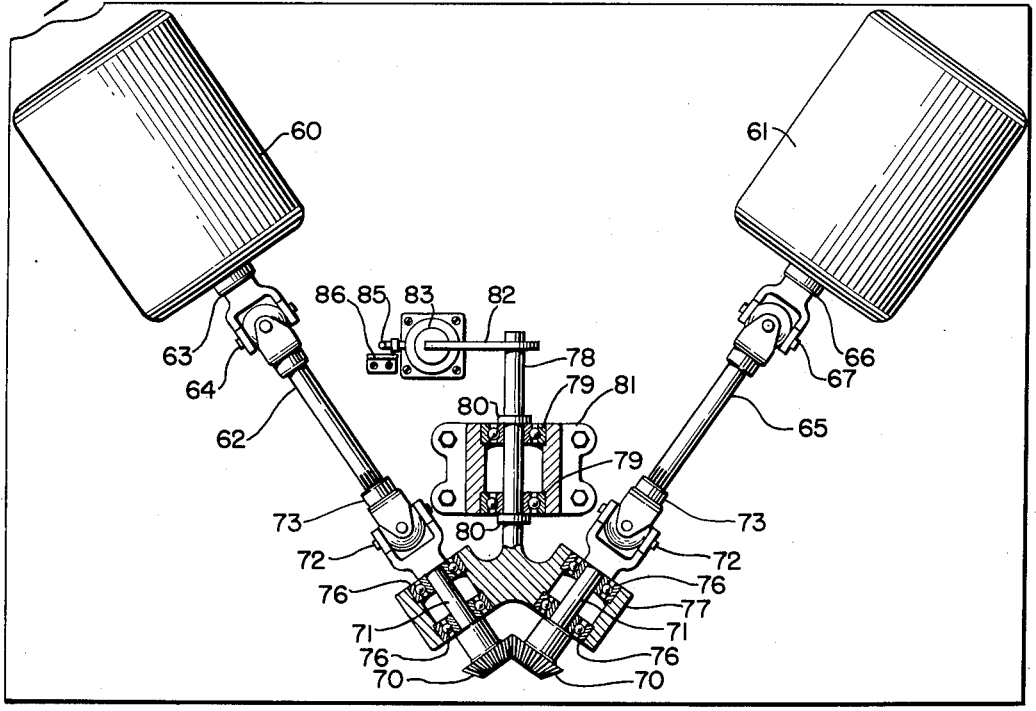
Figure 6 is a view partly in section and partly in plan of a second embodiment of the invention showing the two shafts positioned at a relatively large angle.

In Figure 6, a motor 60 is connected to a generator 61 by means of shafting which includes a drive shaft 62 connected to the motor shaft 63 by universal joint 64 and a driven shaft 65 connected to the generator shaft 66 by a universal joint 67. As in the first described arrangement, the driven shaft 62 and the drive shaft 65 form a angle, in this instance an angle less than 90°, and both terminate short of the vertex of the angle.

The rotary means for operatively interconnecting the drive shaft 62 and the driven shaft 65 in Figure 6 comprises a pair of bevel gears 70 and a corresponding pair of angled shafts 71 on which the bevel gears are mounted. The shafts 71 are connected to the drive shaft 62 and the driven shaft 65, respectively, by universal joints 72. The universal joints 72 are unitary with tubular shaft elements 73 that are slidingly splined on the ends of the shafts 62 and 65 respectively to make the shafting longitudinally extensible.

The two shafts 71 are journaled in corresponding pairs of anti-friction bearings 76 in a bearing means 77 that is mounted for rotation about an appropriate reaction torque axis. For this purpose, the bearing means 77 is mounted on a reaction shaft 78 which extends through a pair of anti-friction bearings 79 with collars 80 on opposite sides of the bearings. The two bearings 79 are mounted in a suitable pedestal 81 in the manner heretofore described. The outer end of the reaction shaft 78 carries a reaction torque arm 82 which presses against a bellows 83 to vary the liquid level in a manometer tube 85 adjacent a scale 86 as heretofore described.

Figure 7 illustrates a third embodiment of the invention in which a drive shaft 90 is at a relatively small angle to a driven shaft 91 and is connected thereto by rotary means including a cylindrical gear 92. The cylindrical gear 92 is formed with longitudinal internal teeth 93. A pair of barrel shaped inclined gears 94 inside the cylindrical gear and in mesh with the longitudinal teeth 93 are mounted on the opposite ends respectively of the two shafts 90 and 91. The cylindrical gear 92 is journaled in a pair of bearings 97 in a bearing means 98 that is carried by a reaction shaft 100 for rotation about a reaction axis. In the manner heretofore described, the shaft 100 is mounted in a pair of bearings 101 in a pedestal 102 and carries a reaction torque arm 103.

A feature of the combination shown in Figure 7 is that the reaction torque arm 103 cooperates with a null-reading force-measuring device, i. e. a force measuring device which returns the reaction torque arm substantially to the same position for any steady torque to be measured. For this purpose, a force measuring device 105 may be employed of the character described in an article entitled "Development of an air-operated force-measuring system" by A. A. Markson and R. S. Williams, printed in the transactions of the A. S. M. E., May 1948, which disclosure is hereby incorporated in the present disclosure by reference.

Figure 8:
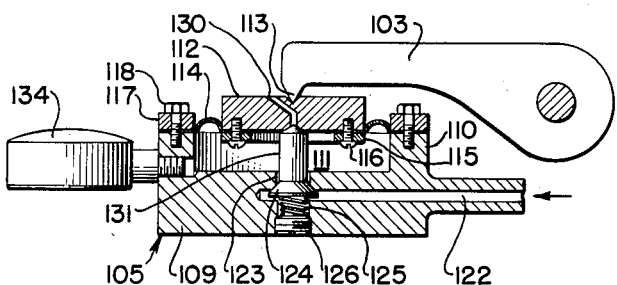
Figure 8 is an enlarged section taken as indicated by the line 8—8 of Figure 7 showing the construction of a null-reading force-measuring device.

As shown in Figure 8, the force-measuring device 105 has a heavy bottom wall 109 and a circular peripheral wall 110 forming a fluid pressure chamber 111 that is closed by a floating top wall 112. The floating top wall 112 has a central recess to seat the pointed end 113 of the reaction torque arm 103 and is movably mounted on the peripheral wall 110 by a suitable flexible annular diaphragm 114. In the construciton shown, the inner circular edge of the diaphragm 114 is secured to the under surface of the floating top wall 112 by a suitable ring 115 and bolts 116, and the outer margin of the diaphragm is anchored in like manner to the peripheral wall 110 by a ring 117 and bolts 118.

Air from a suitable high pressure source (not shown) is supplied through a passage 122 in the bottom wall 109, which passage communicates with the fluid pressure chamber 111 through a port 123. The port 123 is formed to serve as a valve seat for a valve member 124. The valve member 124 is normally held in closed position by a suitable helical spring 125 in compression between the valve member and a removable plug 126.

Air is released from the fluid pressure chamber 111 through a release passage 130 in the floating top wall 112 and the inner end of the release passage is shaped to serve as a valve seat for a second valve member 131. The second valve member 131 is of elongated configuration and is unitary with the first mentioned valve member 124. Normally the reaction torque arm 103 holds the floating top wall 112 against the valve member 131 to close the release passage 130.

With the pressure in the fluid pressure chamber 111 sufficient to balance the force exerted against the floating top wall 112 by the reaction torque arm 103, the inlet passage 122 and the release passage 130 are both closed. If, under such circumstances, the force exerted by the reaction torque arm 103 against the floating top wall 112 should increase, the consequent tendency for the floating top wall to be depressed would result in unseating the valve member 124 to admit additional air from the high pressure source through the passage 122 and the pressure in the chamber 111 would be immediately increased to a magnitude corresponding to the increase in the reaction torque. On the other hand, reduction of the reaction torque as applied against the floating top wall 112 by the arm 103, permits the floating top wall to be lifted by the pressure in the chamber 111 to unseat the valve member 131 for escape of air from the chamber through the release passage 130. The pressure in the chamber thereupon drops in accord with the drop in the reaction torque. Thus the floating top wall 112 moves automatically up and down to maintain the pressure in the chamber 111 at values corresponding to the changing values of the reaction torque and in doing so permits only minute movement by the reaction torque arm. Changes in pressure in the chamber 111 may be indicated by a suitable pressure gauge 134 connected thereto, which gauge may be calibrated, if desired, for direct reading of torque values. A special advantage of such an arrangement is that the pressure gauge 134 may be installed at a convenient point remote from the fluid pressure chamber 111.

Figure 9:
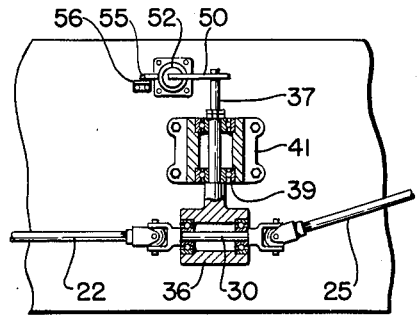
Figures 9 and 10 are fragmentary views similar to Figure 1 illustrating two more embodiments of the invention.
Figure 10:
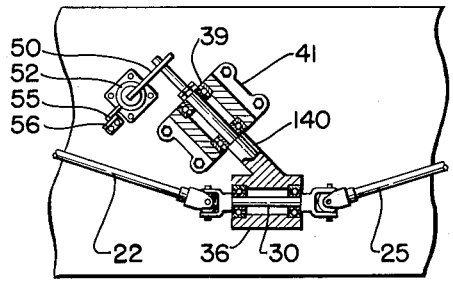

Figures 9 and 10 show arrangements that are largely similar to the arrangements shown in Figures 1 to 5, as indicated by the use of corresponding numerals to indicate corresponding parts. The purpose of Figure 9 is to show that the two shafts 22 and 25 need not form equal angles with the intermediate shaft 30. In this instance the shaft 22 is substantially coaxial with the intermediate shaft 30.

Both Figures 9 and 10 illustrate the fact that the bearing means 36 in which the intermediate shaft 30 is journaled may be adapted for rotation about a reaction axis that does not intersect the angle formed by the two shafts 22 and 25. In Figure 10, the bearing means 36 is mounted on a reaction shaft 140 that is substantially in the same plane as the two shafts 22 and 25, but it is at an angle closer to the shaft 22 than to the shaft 25.

Figure 11:
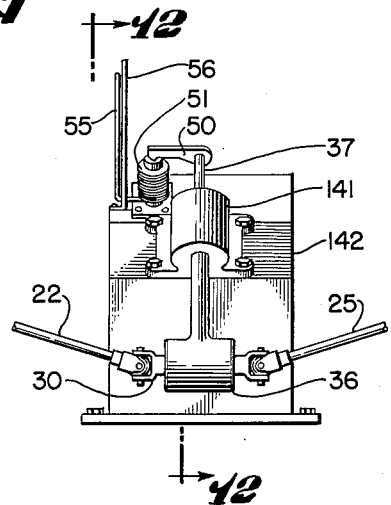
Figure 11 is a fragmentary plan view of another embodiment of the invention.
Figure 12:
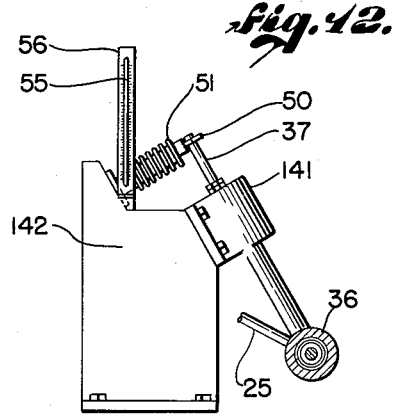
Figure 12 is a sectional view taken as indicated by the broken line 12—12 of Figure 11.

Figures 11 and 12 illustrate how the reaction axis may be positioned at a substantial angle from the plane of the two shafts 22 and 25. Here again, the parts corresponding to the structure shown in Figures 1 to 5 are indicated by corresponding numerals. In this instance, the bearing means 36 in which the intermediate shaft 30 is journaled is mounted on a reaction shaft 37, but the reaction 37 is inclined upward out of the plane of the two shafts 22 and 25. The reaction shaft 37 is journaled in a bearing 141 on a pedestal 142, which pedestal also supports an inclined bellows 51 for controlling the liquid level in a manometer tube 55 adjacent a scale 56.

Progressively inclining the reaction axis away from the optimum bisecting position in the same plane as the drive shaft and driven shaft, as indicated in Figures 9 and 10, reduces the ratio between the reaction torque and the driving torque and inclining the reaction axis progressively out of the plane as indicated in Figures 11 and 12, also reduces the ratio. Thus a wide choice of ratio values may be had by varying the relative direction of the reaction axis in these two respects, as well as by varying the angle between the two shafts 22 and 25.

The invention provides a highly advantageous method for measuring the driving torque in an existing installation where a prime mover is operatively connected by shafting with a power consuming device. It is merely necessary to provide the desired angular relationship in the shafting. One method of obtaining the desired angular relationship between two shaft sections is to shift either the prime mover or the power consuming device thereby to misalign the power source relative to the power consuming device. In some installations, for example in the power plant of an airplane, there may be an existing change in direction in the installation shafting to simplify the application of the present invention to the problem of torque measurement. In nearly any installation, however, it is possible to use offset shafting for the purpose, as exemplified by Figures 1 to 5. Once such an arrangement is set up for operation, it is a simple matter to calibrate the force-measuring mechanism by applying a known static torque to one shaft, while the other shaft is held against rotation. For this purpose, an arm may be temporarily mounted radially on one of the two angled shafts and weighted to apply a known torque for comparison to the resultant reaction torque.

The present disclosure in detail of preferred practices of the invention will suggest to those skilled in the art, various changes, substitutions, and other departures that properly lie within the spirit and scope of the appended claims.

I claim:

1. In a device of the character described for response to the torque transmitted from a power source to a load, the combination of: a drive shaft having one end connected to the power source; a driven shaft having one end connected to the load, said two shafts being positioned relative to each other at an angle greater than 0° and less than 180°; rotary means interconnecting the other ends of the two shafts for transmitting torque from said drive shaft to said driven shaft; bearing means for said rotary means, said bearing means being mounted for rotation about a reaction axis, said axis being at an angle to both of said shafts greater than 0° and less than 180° thereby to provide a reaction torque about said axis in response to the torque transmitted from the drive shaft to the driven shaft, said other ends of both of the two shafts being movable laterally to permit rotation of the bearing means about said axis; and force-resisting means to resist rotation of said bearing means about said reaction axis.

2. A combination as set forth in claim 1 which includes longitudinally extensible connecting means between said power source and said rotary means and between said rotary means and said load device to compensate for changes in the length of the shafting between said two devices arising from rotation of the bearing means about said axis.

3. A combination as set forth in claim 2 in which said drive shaft and said driven shaft are of splined telescoped construction to serve as said longitudinally extensible means.

4. A combination as set forth in claim 1 in which said reaction axis and said two shafts lie substantially in a common plane at the zero torque position of the bearing means.

5. A combination as set forth in claim 4 in which said reaction axis substantially bisects the angle between said two shafts.

6. A combination as set forth in claim 1 in which said two shafts are substantially in a common plane at the zero torque position of said bearing means and said reaction axis is at an angle to said plane.

7. A combination as set forth in claim 1 in which said rotary means is a cylindrical gear with longitudinal internal teeth and in which said shafts are connected to said cylindrical gear by gears therein meshed with said teeth.

8. A combination as set forth in claim 1 in which said angle of the two shafts relative to each other is nearer 90° than 0° and in which said rotary means includes bevel gears.

9. A combination as set forth in claim 8 in which said rotary means comprises a pair of short shafts interconnected by two bevel gears and in which said short shafts are maintained at fixed axial positions relative to each other by said bearing means.

10. A combination as set forth in claim 1 in which the mass of the bearing means and associated structure rotatable about said reaction axis is small to minimize inertia and thereby make said bearing means responsive to transient torque changes.

11. In a device of the character described for response to the torque transmitted from a power source to a load, the combination of: a drive shaft having one end connected to the power source; a driven shaft having one end connected to the load, said two shafts being positioned relative to each other at an angle greater than 0° but less than 180°, the other ends of the two shafts being spaced apart with at least one shaft short of the vertex of said angle; rotary means interconnecting said other ends of the two shafts for transmitting torque from said drive shaft to said driven shaft; bearing means for said rotary means, said bearing means being mounted for rotation about a reaction axis, said axis being at an angle to both of said shafts greater than 0° and less than 180° thereby to provide a reaction torque about said axis in response to the torque transmitted from the drive shaft to the driven shaft, said other ends of the two shafts being movable laterally to permit rotation of the bearing means about said axis; and force-measuring means responsive to the reaction torque of said bearing means about said axis.

12. A combination as set forth in claim 11 in which said force-measuring means comprises a force-responsive liquid container and a manometer connected thereto.

13. A combination as set forth in claim 11 in which said force-measuring means holds said bearing means substantially stationary on said reaction axis throughout a range of reaction torque magnitudes.

14. A combination as set forth in claim 13 in which said force-measuring means automatically draws on a high pressure source to oppose rotation of said bearing means by fluid pressure corresponding to the reaction torque and which includes indicating means responsive to said fluid pressure.

15. In a torque meter for detecting the torque transmitted from a power source to a load, the combination of: a longitudinally extensible drive shaft connected to the power source by a universal joint; a longitudinally extensible driven shaft connected to the load by a universal joint, said two shafts being at an angle greater than 0° but less than 180°; an intermediate shaft connected to said drive shaft and driven shaft respectively by universal joints for the transmission of driving torque from the drive shaft to the driven shaft; a bearing means for said intermediate shaft adapted for rotation about a reaction axis at an angle to all three of the shafts greater than 0° and less 180°; and force-measuring means operatively connected to said bearing means.

References Cited in the file of this patent

UNITED STATES PATENTS

| | | |
|---|---|---|
| 122,700 | Brown | Jan. 16, 1872 |
| 1,557,956 | Zubathy | Oct. 20, 1925 |
| 1,904,713 | Belknap | Apr. 18, 1933 |
| 2,511,674 | Martin | June 13, 1950 |
| 2,623,385 | Jamieson | Dec. 30, 1952 |